United States Patent
Hirokawa

(10) Patent No.: US 11,922,719 B2
(45) Date of Patent: Mar. 5, 2024

(54) IMAGE PROCESSING APPARATUS, IMAGE PROCESSING METHOD, AND RECORDING MEDIUM

(71) Applicant: NEC Corporation, Tokyo (JP)

(72) Inventor: Akira Hirokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/910,936

(22) PCT Filed: Mar. 30, 2020

(86) PCT No.: PCT/JP2020/014512
§ 371 (c)(1),
(2) Date: Sep. 12, 2022

(87) PCT Pub. No.: WO2021/199141
PCT Pub. Date: Oct. 7, 2021

(65) Prior Publication Data
US 2023/0147716 A1    May 11, 2023

(51) Int. Cl.
*G06V 40/12* (2022.01)
*G06T 7/00* (2017.01)
*G06V 10/25* (2022.01)
*G06V 10/70* (2022.01)

(52) U.S. Cl.
CPC ........ *G06V 40/1359* (2022.01); *G06T 7/0002* (2013.01); *G06V 10/25* (2022.01); *G06V 10/70* (2022.01); *G06T 2207/20044* (2013.01)

(58) Field of Classification Search
CPC .... G06V 40/1359; G06V 10/25; G06V 10/70; G06T 7/0002; G06T 2207/20044
See application file for complete search history.

(56) References Cited

U.S. PATENT DOCUMENTS

| | | | |
|---|---|---|---|
| 10,970,509 B1* | 4/2021 | Liu | G06V 40/1365 |
| 2003/0103659 A1 | 6/2003 | Hara et al. | |
| 2016/0379038 A1* | 12/2016 | Vural | G06V 10/993 382/125 |
| 2019/0188443 A1* | 6/2019 | Matsunami | G06V 10/993 |
| 2020/0285882 A1* | 9/2020 | Skovgaard Christensen | G06V 10/806 |

FOREIGN PATENT DOCUMENTS

| | | |
|---|---|---|
| JP | 2003-173445 A | 6/2003 |
| JP | 2018-165911 A | 10/2018 |
| JP | 2019-191913 A | 10/2019 |

OTHER PUBLICATIONS

International Search Report for PCT Application No. PCT/JP2020/014512, dated Jun. 23, 2020.

\* cited by examiner

*Primary Examiner* — Lixi C Simpson

(57) ABSTRACT

An image processing apparatus includes a first skeleton extraction means, a second skeleton extraction means, and an integration unit. The first skeleton extraction means discriminates a valid region and an invalid region in a fingerprint image which is input, and extracts skeleton lines in the valid region. The second skeleton extraction means extracts skeleton lines in the invalid region. The integration unit generates a skeleton image by integrating the skeleton lines extracted in the valid region and the skeleton lines extracted in the invalid region.

9 Claims, 5 Drawing Sheets

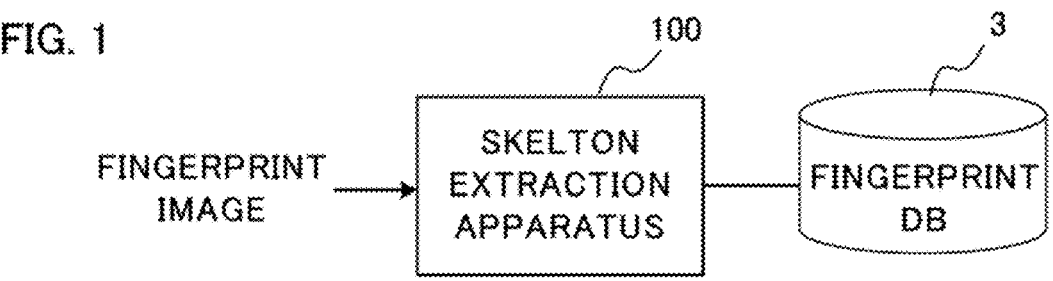
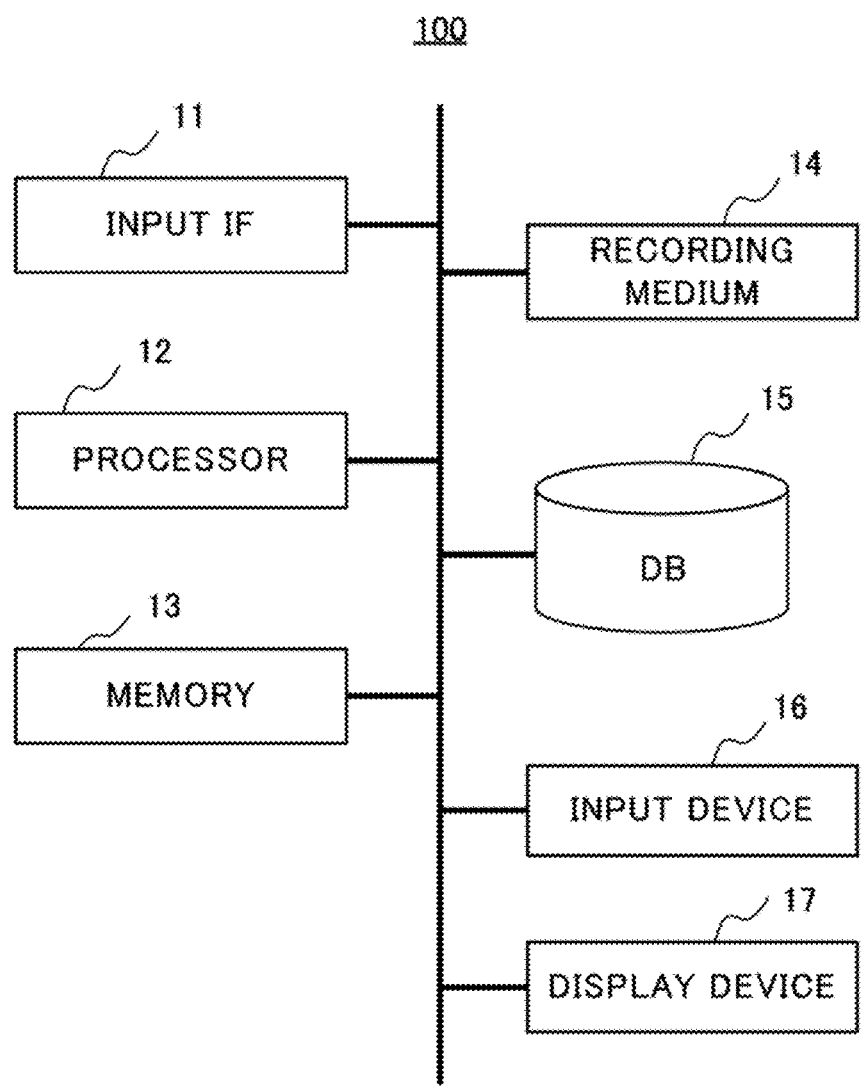

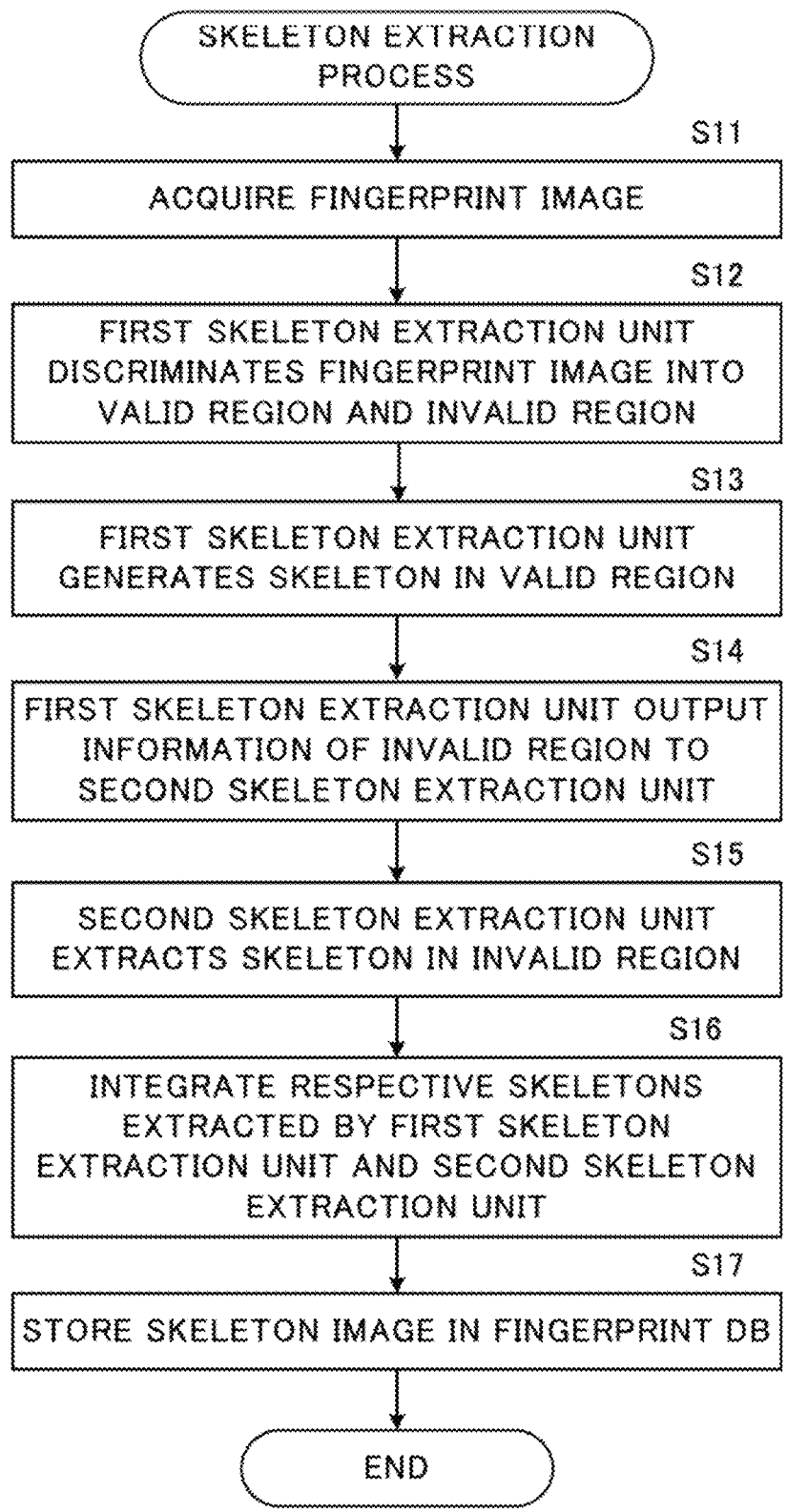

IMAGE PROCESSING APPARATUS, IMAGE PROCESSING METHOD, AND RECORDING MEDIUM

This application is a National Stage Entry of PCT/JP2020/014512 filed on Mar. 30, 2020, the contents of all of which are incorporated herein by reference, in their entirety.

TECHNICAL FIELD

The present disclosure relates to a process of a fingerprint image.

BACKGROUND ART

A fingerprint authentication is known as one method of biometric authentication. In the fingerprint authentication, a fingerprint image of a specific person and data of feature points extracted from a fingerprint image are stored in a fingerprint database. In a case of matching fingerprints, the feature points are extracted from a target fingerprint image, and it is determined whether or not a subject person matches a specific person based on a degree of similarity with feature points of each of fingerprints registered in the fingerprint database. Patent Document 1 describes a method for extracting an area of each region where no feature point is present in the fingerprint image as a degree of skeleton stability, and using the degree of skeleton stability to match fingerprints.

PRECEDING TECHNICAL REFERENCES

Patent Document

Patent Document 1: Japanese Laid-open Patent Publication No. 2003-173445

SUMMARY

Problem to be Solved by the Invention

In a fingerprint database for registering a fingerprint of a specific person, a fingerprint image obtained by a scanner or the like is not stored as it is, but the fingerprint image is stored after necessary correction such as extraction of skeleton lines with respect to the fingerprint image. Since the fingerprint image stored in the fingerprint database is used for matching with a fingerprint of a subject, it is preferable that the skeleton lines are extracted over a widest possible range for the fingerprint image.

It is one object of the present disclosure to provide an image processing apparatus capable of extracting the skeleton lines in the widest possible range for the fingerprint image.

Means for Solving the Problem

According to an example aspect of the present disclosure, there is provided an image processing apparatus including:
a first skeleton extraction means configured to discriminate a valid region and an invalid region in a fingerprint image which is input, and extract skeleton lines in the valid region;
a second skeleton extraction means configured to extract skeleton lines in the invalid region; and
an integration unit configured to integrate the skeleton lines extracted in the valid region and the skeleton lines extracted in the invalid region, and generate a skeleton image corresponding to the fingerprint image.

According to another example aspect of the present disclosure, there is provided an image processing method, including:
discriminating a valid region and an invalid region in a fingerprint image which is input, and extracting skeleton lines in the valid region;
extracting skeleton lines in the invalid region; and
integrating the skeleton lines extracted in the valid region and the skeleton lines extracted in the invalid region, and generate a skeleton image corresponding to the fingerprint image.

According to still another example aspect of the present disclosure, there is provided a recording medium storing a program, the program causing a computer to perform a process including:
discriminating a valid region and an invalid region in a fingerprint image which is input, and extracting skeleton lines in the valid region;
extracting skeleton lines in the invalid region; and
integrating the skeleton lines extracted in the valid region and the skeleton lines extracted in the invalid region, and generate a skeleton image corresponding to the fingerprint image.

Effect of the Invention

According to the present disclosure, it becomes possible to extract skeleton lines in a widest possible range for a fingerprint image.

BRIEF DESCRIPTION OF THE DRAWINGS

FIG. 1 illustrates a skeleton extraction apparatus according a first example embodiment.
FIG. 2 is a block diagram illustrating a hardware configuration of the skeleton extraction apparatus.
FIG. 5 is a flowchart of a skeleton extraction process.

EXAMPLE EMBODIMENTS

Figure 3:
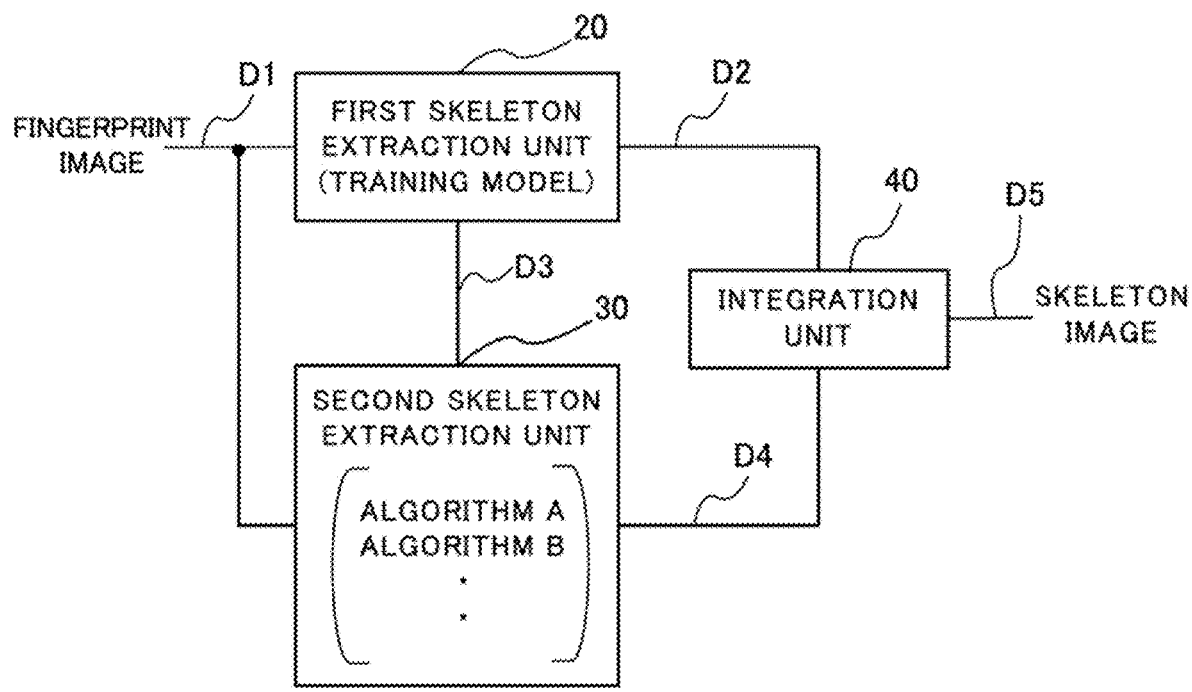
FIG. 3 is a block diagram illustrating a functional configuration of the skeleton extraction apparatus.

In the following, example embodiments will be described with reference to the accompanying drawings.

First Example Embodiment

[Skeleton Extraction Apparatus]
FIG. 1 illustrates an outline of a skeleton extraction apparatus according to a first example embodiment of the present disclosure. The skeleton extraction apparatus 100 is an apparatus for extracting skeleton lines of a fingerprint image to be input and generating a skeleton image. The "skeleton lines" are represented by thin lines with a constant width indicating ridges in a fingerprint image. As depicted, the skeleton extraction apparatus 100 is connected to a fingerprint database (hereinafter referred to as a "DB") 3. A fingerprint image is input to the skeleton extraction apparatus 100. The fingerprint image to be input is a fingerprint of a person to be registered (hereinafter, referred to as a "person to be registered") in the fingerprint DB 3 such as a criminal or the like, for instance. For instance, in a criminal investigation, fingerprints collected at a scene of a crime are matched with a number of fingerprints registered in the fingerprint DB 3 in order to specify a person.

Each fingerprint image acquired from the person to be registered by using a scanner or the like are not as is, but are registered in the fingerprint DB 3 after necessary corrections have been performed. The skeleton extraction apparatus 100 generates a skeleton image by extracting skeleton lines from each fingerprint image acquired from the person to be registered, and registers the skeleton image in the fingerprint DB 3. The fingerprint DB 3 stores sets of fingerprint data with respect to a plurality of persons. Each set of fingerprint data includes identification information (ID) for identifying the fingerprint data, a fingerprint image including a skeleton image, and feature point data indicating feature points extracted from the fingerprint image. Note that, the fingerprint data may include information concerning an owner of the fingerprint.

[Hardware Configuration]

FIG. 2 is a block diagram illustrating a hardware configuration of the skeleton extraction apparatus 100. As illustrated, the skeleton extraction apparatus 100 includes an input IF (InterFace) 11, a processor 12, a memory 13, a recording medium 14, a database (DB) 15, an input device 16, and a display device 17.

The input IF 11 inputs and outputs data. Specifically, the input IF 11 acquires a fingerprint image and outputs a skeleton image generated by the skeleton extraction apparatus 100 to the fingerprint DB 3.

The processor 12 is a computer such as a CPU (Central Processing Unit) or a GPU (Graphics Processing Unit), and controls the entire skeleton extraction apparatus 100 by executing programs prepared in advance. In particular, the processor 12 performs a skeleton extraction process to be described later.

The memory 13 is configured by a ROM (Read Only Memory), a RAM (Random Access Memory), or the like. The memory 13 stores various programs to be executed by the processor 12. The memory 13 is also used as a working memory during executions of various processes by the processor 12.

The recording medium 14 is a non-volatile and non-transitory recording medium such as a disk-shaped recording medium or a semiconductor memory, and is formed to be detachable from the skeleton extraction apparatus 100. The recording medium 14 records various programs executed by the processor 12.

The DB 15 stores each fingerprint image input from the input IF 11. In addition, the DB 15 stores a skeleton extraction model to be used when the skeleton extraction process is executed, and information concerning a skeleton extraction algorithm.

The input device 16 is, for instance, a keyboard, a mouse, a touch panel, or the like, and is used when a user performs necessary instructions and inputs in connection with processes by the skeleton extraction apparatus 100. The display device 17 is, for instance, a liquid crystal display, in response to an instruction of the user, and displays an input fingerprint image or a skeleton image or the like.

[Function Configuration]

FIG. 3 is a block diagram illustrating a functional configuration of the skeleton extraction apparatus 100. The skeleton extraction apparatus 100 includes a first skeleton extraction unit 20, a second skeleton extraction unit 30, and an integration unit 40. A fingerprint image D1 is input to the first skeleton extraction unit 20 and the second skeleton extraction unit 30. The first skeleton extraction unit 20 first discriminates a valid region and an invalid region in the entire area of the input fingerprint image D1. The valid region corresponds to a region where a quality of the fingerprint image is high and the ridges are clear. On the other hand, the invalid region is the region where the quality of the fingerprint image is low and the ridges are unclear. Moreover, the first skeleton extraction unit 20 extracts skeleton lines based on the ridges in the valid region. Specifically, the first skeleton extraction unit 20 generates skeleton lines with a constant width in a similar shape to the ridges based on the ridges in the valid region. Next, the first skeleton extraction unit 20 outputs an extraction result D2 including region information indicating the valid region and the invalid region, and the skeleton information indicating the skeleton lines extracted in the valid region, to the integration unit 40. In addition, the first skeleton extraction unit 20 outputs information D3 indicating the invalid region to the second skeleton extraction unit 30.

The first skeleton extraction unit 20 extracts the skeleton lines from the fingerprint image D1 using the skeleton extraction model generated by a machine learning. The skeleton extraction model is a model which inputs a fingerprint image as input data, and which is trained by using, as correct answer data, a fingerprint image acquired by drawing skeleton lines on the input fingerprint image by a forensic examiner or the like. That is, the correct answer data used for learning correspond to the fingerprint image in which the valid region and the invalid region are discriminated and the skeleton lines are drawn by the forensic examiner or the like in the valid region. The forensic examiner or the like looks at the fingerprint image and designates each region where the quality of the fingerprint image is low, as the invalid region, and furthermore, draws skeleton lines in a region other than the invalid region, that is, in the valid region to create the correct answer data. After that, training of the skeleton extraction model is performed using a pair of an original fingerprint image and the correct answer data created based on the original fingerprint image, as training data. It is possible for the first skeleton extraction unit 20 to improve accuracy in a form in accordance with a tendency at a scene where the apparatus has been introduced, by using a model that has been trained by the data input by the forensic examiner.

In detail, at the time of learning, the original fingerprint image is input to the skeleton extraction model as the input data. The skeleton extraction model discriminates the valid region and the invalid region in the entire area of the input data, and outputs a skeleton image in which the skeleton lines in the valid region are extracted. The skeleton image output from the skeleton extraction model is compared with the correct answer data, and parameters of the skeleton extraction model are updated based on those errors. By this manner, the training of the skeleton extraction model is performed using a large number of sets of training data, and the trained skeleton extraction model is used in the first skeleton extraction unit 20.

In general, in a case of generating the correct answer data, the forensic examiner or the like specifies, as the invalid region, each region such as a peripheral portion or a corner portion of a rectangular fingerprint image, which is determined not to be used for matching of a fingerprint. Since the skeleton extraction model is trained so as to generate an output close to the correct answer data prepared by the forensic examiner or the like, each peripheral portion or each corner portion of the input fingerprint image is determined as the invalid region, and the skeleton lines are not generated in the invalid region. However, even in a region which the skeleton extraction model determines as the invalid region, ridge lines actually are included in the region; accordingly, it is preferable to extract skeleton lines as much as possible in that region. Therefore, in the present example embodiment, in the region where the first skeleton extraction unit 20 is determined to be the invalid region, the second skeleton extraction unit 30 performs an extraction of the skeleton lines.

The second skeleton extraction unit 30 extracts skeleton lines from the invalid region using the skeleton extraction algorithm that does not use a model by machine learning (hereinafter, simply referred to as an "algorithm"). The second skeleton extraction unit 30 may use a predetermined one algorithm or may use a plurality of algorithms. The second skeleton extraction unit 30 determines whether the extraction of skeleton lines can be performed using a unique reference in the region where the first skeleton extraction unit 20 has determined as the invalid region. After that, the second skeleton extraction unit 30 extracts the skeleton lines within the region determined as the skeleton lines can be extracted (hereinafter referred to as a "skeleton extractable region"), and outputs an extraction result D4 including region information indicating an extractable region and skeleton information indicating the extracted skeleton lines to the integration unit 40. Accordingly, since the second skeleton extraction unit 30 sets the skeleton extractable region with the unique reference being different from a reference of the first skeleton extraction unit 20, and extracts the skeleton lines, it is possible to extract the skeleton lines even in the region where the first skeleton extraction unit 20 does not extract the skeleton lines.

The integration unit 40 integrates the extraction result D2 input from the first skeleton extraction unit 20 and the extraction result D4 input from the second skeleton extraction unit 30 to output a final skeleton image D5. The skeleton image D5 includes region information indicating the valid region and the invalid region in the input fingerprint image and information of skeleton lines extracted from the fingerprint image. Specifically, the integration unit 40 first reflects the valid region indicated by the extraction result D2 input from the first skeleton extraction unit 20 and skeleton information extracted in the valid region, to the skeleton image. Moreover, in a case where there is an area where the second skeleton extraction unit 30 is determined to be the skeleton extractable region in the invalid region indicated by the extraction result D2, the integration unit 40 changes the area to the valid region, and adopts the skeleton information, which is extracted by the second skeleton extraction unit 30 in the region as the skeleton information in the valid region. In other words, the integration unit 40 sets the valid region determined by the second skeleton extraction unit 30 in the region, which the region in which the first skeleton extraction unit 20 has determined as the invalid region and has not extracted skeleton lines, and adds skeleton lines in that region. By these processes, the extraction of skeleton lines is also performed with respect to the region which the first skeleton extraction unit 20 has determined as the invalid region. Note that when the first skeleton extraction unit 20 determines a plurality of regions as invalid regions, the integration unit 40 additionally applies the skeleton information extracted by the second skeleton extraction unit 30 to each of the invalid regions.

Figure 4A:
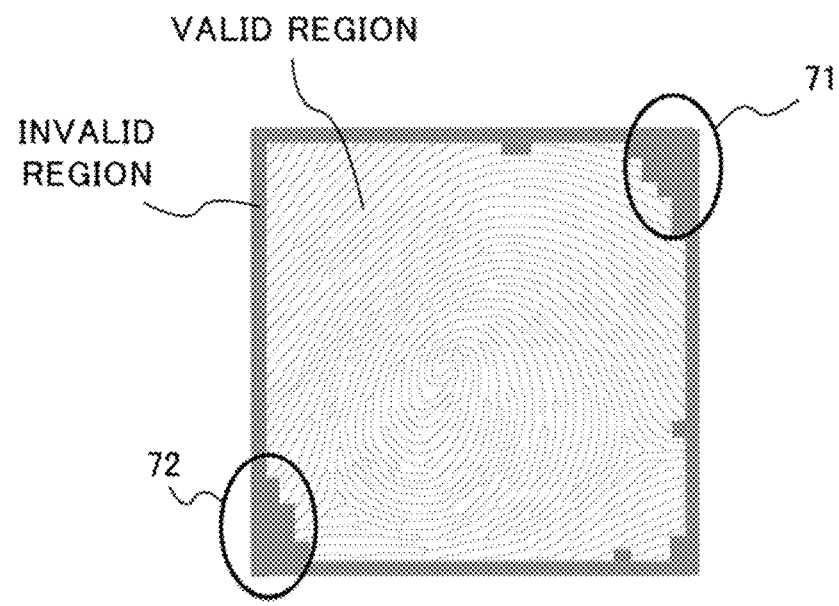
FIG. 4 illustrates an example of an invalid region in a fingerprint image.

FIG. 4A is an example of the extraction result D2 output by the first skeleton extraction unit 20. In the rectangular area corresponding to the input fingerprint image, surrounding gray regions are the invalid regions determined by the first skeleton extraction unit 20, a region other than the gray invalid regions is the valid region. As illustrated, the skeleton lines have been extracted in the valid region, but the skeleton lines have not been extracted in the invalid regions. In particular, since an upper right region 71, a lower left region 72, and the like are relatively wide regions, in a case where skeleton lines can be extracted in such the invalid regions, it is possible to use the skeleton lines to match fingerprints.

Figure 4B:
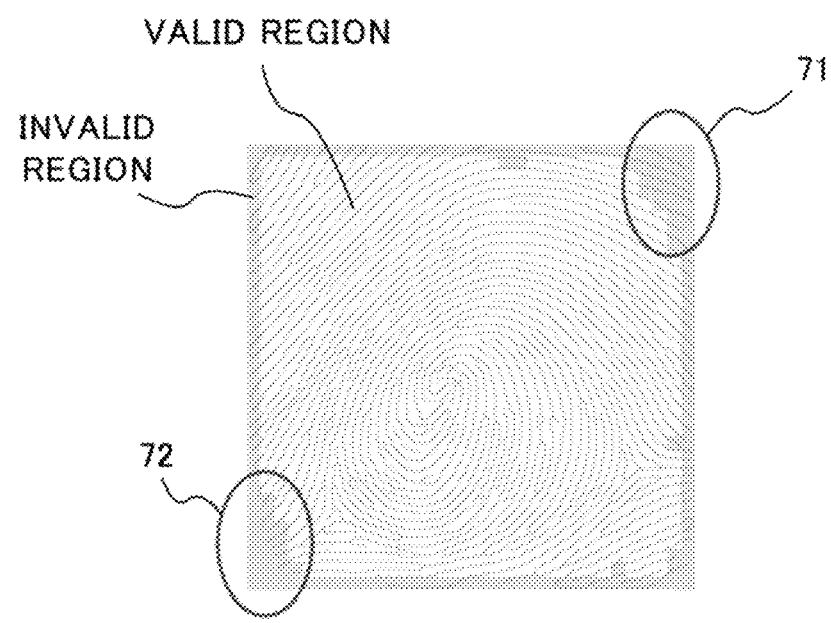

FIG. 4B illustrates an example of the skeleton image D5 output by the integration unit 40. As can be seen in comparison with FIG. 4A, the skeleton lines are also extracted in the gray invalid regions. The skeleton lines in the invalid regions are lines which are extracted by the second skeleton extraction unit 30 and added by the integration unit 40. As described above, in the present example embodiment, even in a region where a machine-learned skeleton extraction model has determined to be the invalid region, it is possible to extract the skeleton lines as much as possible and register the extracted skeleton lines in the fingerprint DB 3. In particular, the skeleton lines, which are extracted in relatively large regions such as the regions 71 and 72, may be used as useful information at a time of matching fingerprint images.

Next, the second skeleton extraction unit 30 will be described in detail. The second skeleton extraction unit 30 extracts the skeleton lines by applying one or more algorithms without using a machine-learned model. In a case of using a plurality of algorithms, the second skeleton extraction unit 30 uses algorithms having different process methods and properties. For instance, a plurality of algorithms having different properties can be used, such as an algorithm having a property for faithfully extracting each skeleton line along a shape of each ridge in an original fingerprint image, an algorithm for extracting skeleton lines with emphasis on a tendency of a whole pattern drawn by a large number of ridges in the original fingerprint image, and the like.

In the simplest example, among the plurality of algorithms, one algorithm having the highest accuracy is determined in advance, the second skeleton extraction unit 30 extracts skeleton lines from the invalid region by applying the algorithm.

In another method, the second skeleton extraction unit 30 applies a plurality of algorithms to the invalid region determined by the first skeleton extraction unit 20, and selects and uses an algorithm having the highest reliability. That is, for each invalid region determined by the first skeleton extraction unit 20, a determination of each region and an extraction of skeleton lines are carried out by actually applying the plurality of algorithms, and thus, one algorithm having the highest degree of reliability is selected among result acquired by applying the plurality of algorithms. By this method, it possible to adopt an optimal result among the results acquired by applying the plurality of algorithms.

In this case, as an example of the degree of reliability, a quality evaluation value of the fingerprint image determined by each algorithm may be used. That is, each algorithm is used to evaluate the quality of the fingerprint image in the invalid region, and an algorithm outputting the highest quality evaluation value is selected. Here, although the fingerprint image in the invalid region processed by each of algorithms are identical, quality evaluation values of the fingerprint image by respective algorithms are different depending on respective characteristics of the algorithms, an analysis method of ridges, and the like. Accordingly, the algorithm which can evaluate the same fingerprint image with high quality is considered to have high accuracy of skeleton lines to be extracted. Therefore, the second skeleton extraction unit 30 evaluates the quality of the fingerprint image in the invalid region using a plurality of algorithms, and extracts the skeleton lines using the algorithm having the highest quality evaluation value. As an example of the quality evaluation method of the fingerprint image, a dispersion value of a thickness of the ridges included in the fingerprint image can be used. Note that the second skeleton extraction unit 30 may use a value or an index other than the quality evaluation value of the fingerprint image, and may select an optimal algorithm. By applying a plurality of algorithms to the second skeleton extraction unit 30, it is possible to extract the skeleton lines using the optimal algorithm according to features and characteristics of the fingerprint image.

[Skeleton Extraction Process]

Next, a skeleton extraction process executed by the skeleton extraction apparatus 100 will be described. FIG. 5 is a flowchart of the skeleton extraction process. This process is realized by the processor 12 illustrated in FIG. 2, which executes a program prepared in advance and operates as each element illustrated in FIG. 3.

First, a fingerprint image is input to the skeleton extraction apparatus 100, and the first skeleton extraction unit 20, and each of the second skeleton extraction unit 30 acquires the fingerprint image D1 (step S11). Next, the first skeleton extraction unit 20 discriminates the valid region and the invalid region in the fingerprint image by using the skeleton extraction model (step S12). Next, the first skeleton extraction unit 20 extracts skeleton lines in the invalid region, and outputs the extraction result D2 to the integration unit 40 (step S13). The first skeleton extraction unit 20 outputs the information D3 indicating the invalid region to the second skeleton extraction unit 30 (step S14).

The second skeleton extraction unit 30 specifies the invalid region of the fingerprint image based on the information D3 indicating the invalid region, extracts skeleton lines in the extractable region within the invalid region, and outputs the extraction result D4 to the integration unit 40 (step S15). The integration unit 40 generates the skeleton image D5 by integrating the extraction result D2 by the first skeleton extraction unit 20 and the extraction result D4 by the second skeleton extraction unit 30 (step S16). At this time, in the invalid region determined by the first skeleton extraction unit 20, in a case where the second skeleton extraction unit 30 extracts skeleton lines, the integration unit 40 changes that invalid region to the valid region, and additionally provides the extracted skeleton lines. The integration unit 40 stores the generated skeleton image D5 in the fingerprint DB 3 (step S17). After that, the skeleton extraction process is terminated.

[Modification]

(Modification 1)

In the above-described example embodiment, the first skeleton extraction unit 20 using the skeleton extraction model does not extract skeleton lines in the invalid region; however, instead, the skeleton extraction model of a type for extracting the skeleton lines as much as possible in the invalid region may be used. In that case, similarly to the above-described example embodiment, in a case where the second skeleton extraction unit 30 extracts skeleton lines in the invalid region, the integration unit 40 may overwrite the skeleton lines extracted by the first skeleton extraction unit with the skeleton lines extracted by the second skeleton extraction unit 30. Instead, in a case where the second skeleton extraction unit 30 extracts skeleton lines in the invalid region, the integration unit 40 compares qualities and degrees of reliability of the skeleton lines extracted by the first skeleton extraction unit 20 and the skeleton lines extracted by the second skeleton extraction unit 30.

(Modification 2)

In the above-described example embodiment, the second skeleton extraction unit 30 does not use the machine-learned model. Instead, as the second skeleton extraction unit, a model, which is different from the first skeleton extraction unit 20 and is machine-learned with a different reference from the first skeleton extraction unit 20, may be used.

Second Example Embodiment

Figure 6:
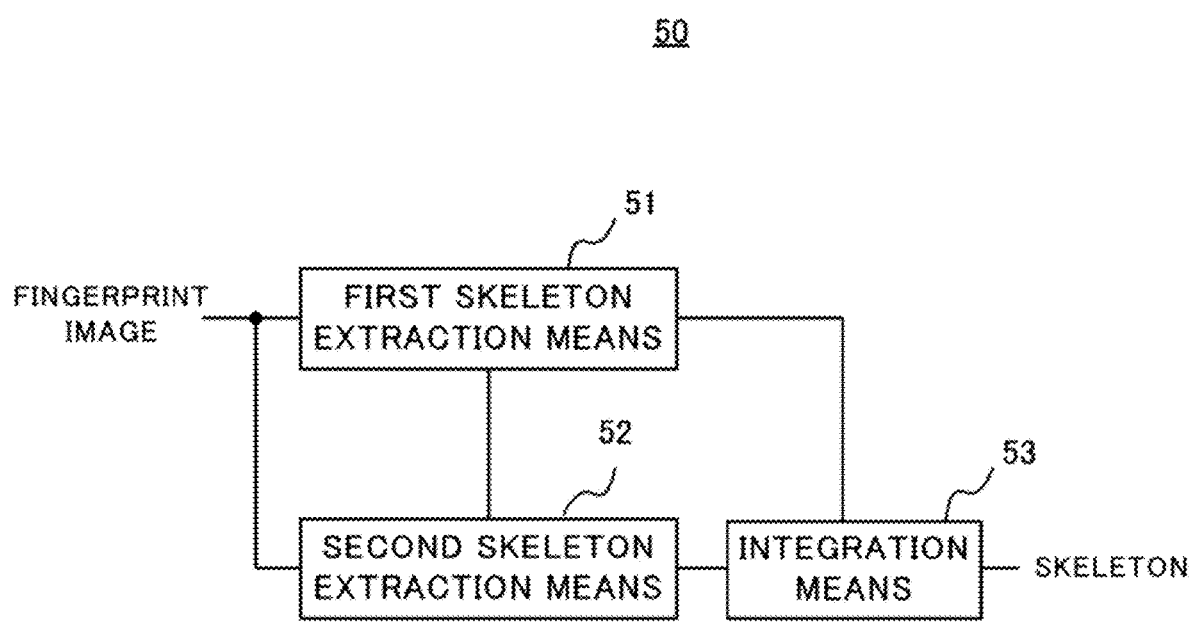
FIG. 6 is a block diagram illustrating a functional configuration of an image processing apparatus according to a second example embodiment.

FIG. 6 is a block diagram illustrating a functional configuration of an image processing apparatus 50 according to a second example embodiment. The image processing apparatus 50 includes a first skeleton extraction means 51, a second skeleton extraction means 52, and an integration means 53. The first skeleton extraction means 51 discriminates a valid region and an invalid region in the input fingerprint image, and extracts skeleton lines within the valid region. The second skeleton extraction means 52 extracts skeleton lines in the invalid region. The integration means 53 integrates the skeleton lines extracted in the valid region and the skeleton lines extracted in the invalid region, and generates a skeleton image corresponding to the fingerprint image.

A part or all of the example embodiments described above may also be described as the following supplementary notes, but not limited thereto.

(Supplementary Note 1)

1. An image processing apparatus comprising:
   a first skeleton extraction means configured to discriminate a valid region and an invalid region in a fingerprint image which is input, and extract skeleton lines in the valid region;
   a second skeleton extraction means configured to extract skeleton lines in the invalid region; and
   an integration means configured to integrate the skeleton lines extracted in the valid region and the skeleton lines extracted in the invalid region, and generate a skeleton image corresponding to the fingerprint image.

(Supplementary Note 2)

2. The image processing apparatus according to claim 1, wherein the first skeleton extraction means extracts the skeleton lines using a skeleton generation model which has been trained by machine learning.

(Supplementary Note 3)

3. The image processing apparatus according to claim 1 or 2, wherein the first skeleton extraction means does not extract the skeleton lines in the invalid region.

(Supplementary Note 4)

4. The image processing apparatus according to any one of claims 1 through 3, wherein the second skeleton extraction means detects an extractable region, in which skeleton lines can be extracted with a reference of the second skeleton extraction means, in the invalid region, and generates the skeleton lines in the executable region.

(Supplementary Note 5)

5. The image processing apparatus according to claim 4, wherein the integration means changes the executable region detected by the second skeleton extraction means into a valid region in the invalid region.

(Supplementary Note 6)

6. The image processing apparatus according to any one of claims 1 through 5, wherein the second skeleton extraction means extracts the skeleton lines in the invalid region by applying one or more of a plurality of algorithms.

(Supplementary Note 7)

7. The image processing apparatus according to claim 6, wherein the second skeleton extraction means calculates a quality evaluation value of the fingerprint image within the invalid region by applying the plurality of algorithms, and generates the skeleton lines using an algorithm by which the highest quality evaluation value is acquired.

(Supplementary Note 8)

8. The image processing apparatus according to claim 6 or 7, wherein the second skeleton extraction means determines the algorithm to apply for each invalid region, in a case where the first skeleton extraction means sets a plurality of invalid regions.

(Supplementary Note 9)

9. An image processing method, comprising:
discriminating a valid region and an invalid region in a fingerprint image which is input, and extracting skeleton lines in the valid region;
extracting skeleton lines in the invalid region; and
integrating the skeleton lines extracted in the valid region and the skeleton lines extracted in the invalid region, and generate a skeleton image corresponding to the fingerprint image.

(Supplementary Note 10)

10. A recording medium storing a program, the program causing a computer to perform a process comprising:
discriminating a valid region and an invalid region in a fingerprint image which is input, and extracting skeleton lines in the valid region;
extracting skeleton lines in the invalid region; and
integrating the skeleton lines extracted in the valid region and the skeleton lines extracted in the invalid region, and generate a skeleton image corresponding to the fingerprint image.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

3 Fingerprint database (DB)
11 Input IF
12 Processor
13 Memory
14 Recording medium
15 Database
16 Input device
17 Display device
20 First skeleton extraction unit
30 Second skeleton extraction unit
40 Integration unit
50 Image processing apparatus
51 First skeleton extraction means
52 Second skeleton extraction means
53 Integration means

What is claimed is:

1. An image processing apparatus comprising:
a memory storing instructions; and
one or more processors configured to execute the instructions to:
discriminate a valid region and an invalid region in a fingerprint image which is input, and extract first skeleton lines in the valid region and in the invalid region, by using a first skeleton extraction technique;
extract second skeleton lines in the invalid region by using a second skeleton extraction technique;
integrate the first skeleton lines and the second skeleton lines based on a comparison in reliability between the first skeleton lines extracted in the invalid region by using the first skeleton extraction technique and the second skeleton lines extracted in the invalid region by using the second extraction technique; and
generate a skeleton image corresponding to the fingerprint image and including the integrated first skeleton lines.

2. The image processing apparatus according to claim 1, wherein the processor the first skeleton extraction technique uses a skeleton generation model which has been trained by machine learning.

3. The image processing apparatus according to claim 1, wherein the second skeleton extraction technique detects an extractable region in the invalid region discriminated using the first skeleton extraction technique and extracts the second skeleton lines in the extractable region.

4. The image processing apparatus according to claim 3, wherein the second skeleton extraction technique divides the extractable region into a second valid region and a second invalid region.

5. The image processing apparatus according to claim 1, wherein the second skeleton extraction technique extracts the second skeleton lines in the invalid region by applying one or more of a plurality of algorithms.

6. The image processing apparatus according to claim 5, wherein the second skeleton extraction technique calculates a quality evaluation value of the fingerprint image within the invalid region by applying the plurality of algorithms, and extracts the second skeleton lines using the algorithm having the quality evaluation value that is highest.

7. The image processing apparatus according to claim 5, wherein the invalid region is one of a plurality of invalid regions, and the second skeleton extraction technique applies each algorithm for each invalid region.

8. An image processing method comprising:
discriminating, by a processor, a valid region and an invalid region in a fingerprint image which is input, and extracting first skeleton lines in the valid region and in the invalid region, by using a first skeleton extraction technique;
extracting, by the processor, second skeleton lines in the invalid region by using a second skeleton extraction technique;
integrating, by the processor, the first skeleton lines and the second skeleton lines based on a comparison in reliability between the first skeleton lines extracted in the invalid region by using the first skeleton extraction technique and the second skeleton lines extracted in the invalid region by using the second extraction technique; and
generating, by the processor, a skeleton image corresponding to the fingerprint image and including the integrated first skeleton lines.

9. A non-transitory computer-readable recording medium storing a program executable by a computer to perform a process comprising:
discriminating, by a processor, a valid region and an invalid region in a fingerprint image which is input, and extracting first skeleton lines in the valid region and in the invalid region, by using a first skeleton extraction technique;

extracting, by the processor, second skeleton lines in the invalid region by using a second skeleton extraction technique;

integrating, by the processor, the first skeleton lines and the second skeleton lines based on a comparison in reliability between the first skeleton lines extracted in the invalid region by using the first skeleton extraction technique and the second skeleton lines extracted in the invalid region by using the second extraction technique, and generating, by the processor, a skeleton image corresponding to the fingerprint image and including the integrated first skeleton lines.

\* \* \* \* \*